(12) United States Patent
Iwatani et al.

(10) Patent No.: US 8,813,493 B2
(45) Date of Patent: Aug. 26, 2014

(54) SUPERCHARGER CONTROL DEVICE FOR AN INTERNAL COMBUSTION ENGINE

(75) Inventors: Kazuki Iwatani, Susono (JP); Taro Aoyama, Susono (JP); Yoshio Yamashita, Susono (JP); Hiroshi Oyagi, Susono (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 361 days.

(21) Appl. No.: 13/003,820

(22) PCT Filed: Dec. 11, 2008

(86) PCT No.: PCT/JP2008/072528
§ 371 (c)(1),
(2), (4) Date: Jan. 12, 2011

(87) PCT Pub. No.: WO2010/067438
PCT Pub. Date: Jun. 17, 2010

(65) Prior Publication Data
US 2011/0146634 A1    Jun. 23, 2011

(51) Int. Cl.
| | |
|---|---|
| *F02B 33/44* | (2006.01) |
| *F02M 25/07* | (2006.01) |
| *F02D 23/00* | (2006.01) |
| *F02B 37/007* | (2006.01) |
| *F02B 37/16* | (2006.01) |
| *F02B 37/00* | (2006.01) |
| *F02B 37/12* | (2006.01) |
| *F02D 41/00* | (2006.01) |
| *F02B 37/18* | (2006.01) |

(52) U.S. Cl.
CPC .......... *F02B 37/007* (2013.01); *F02M 25/0711* (2013.01); *F02D 23/00* (2013.01); *F02M 25/0707* (2013.01); *Y02T 10/144* (2013.01); *F02M 25/0728* (2013.01); *F02B 37/16* (2013.01); *F02B 37/001* (2013.01); *F02B 37/12* (2013.01); *F02D 41/0007* (2013.01); *F02B 37/18* (2013.01)
USPC .............. 60/612; 60/605.1; 60/611; 123/562; 123/564

(58) Field of Classification Search
None
See application file for complete search history.

(56) References Cited

U.S. PATENT DOCUMENTS

| | | | | |
|---|---|---|---|---|
| 5,140,817 A | * | 8/1992 | Matsuda et al. ................. | 60/612 |
| 6,907,867 B2 | * | 6/2005 | Igarashi et al. ............... | 123/565 |

FOREIGN PATENT DOCUMENTS

| | | |
|---|---|---|
| JP | 03-092540 A | 4/1991 |
| JP | 04-241730 A | 8/1992 |

(Continued)

OTHER PUBLICATIONS

English Translation of 09-222489.*

(Continued)

*Primary Examiner* — Thomas Denion
*Assistant Examiner* — Jessica Kebea
(74) *Attorney, Agent, or Firm* — Kenyon & Kenyon LLP

(57) ABSTRACT

A supercharger control device for an internal combustion engine is preferably applied to a system having a first supercharger and a second supercharger. A switching supercharging pressure setting unit sets a switching supercharging pressure used in case of switching a mode for operating the first supercharger and the second supercharger, based on a difference between a target supercharging pressure and an actual supercharging pressure. When the actual supercharging pressure reaches the switching supercharging pressure, a switching control unit performs a control of switching the mode. Therefore, it becomes possible to appropriately prevent the overshoot of the supercharging pressure at the time of switching the mode.

7 Claims, 12 Drawing Sheets

(56) References Cited

FOREIGN PATENT DOCUMENTS

| | | | |
|---|---|---|---|
| JP | 4-241731 A | | 8/1992 |
| JP | 05-098976 | | 4/1993 |
| JP | 05-163952 A | | 6/1993 |
| JP | 07-034889 A | | 2/1995 |
| JP | 08-295153 A | | 11/1996 |
| JP | 09-222489 A | | 8/1997 |
| JP | 2000-120441 A | | 4/2000 |
| JP | 2000-130174 A | | 5/2000 |
| JP | 2000220485 A | * | 8/2000 |
| JP | 2000-345871 A | | 12/2000 |
| JP | 2005-83275 A | | 3/2005 |
| JP | 2006233881 A | * | 9/2006 |
| JP | 2007-332956 A | | 12/2007 |
| JP | 2008-128129 A | | 6/2008 |
| JP | 2008-175114 A | | 7/2008 |

OTHER PUBLICATIONS

Office Action issued Feb. 14, 2012 in JP 2010-541929 & English translation thereof.

* cited by examiner

9: SUPERCHARGING PRESSURE SENSOR
12: EGR COOLER

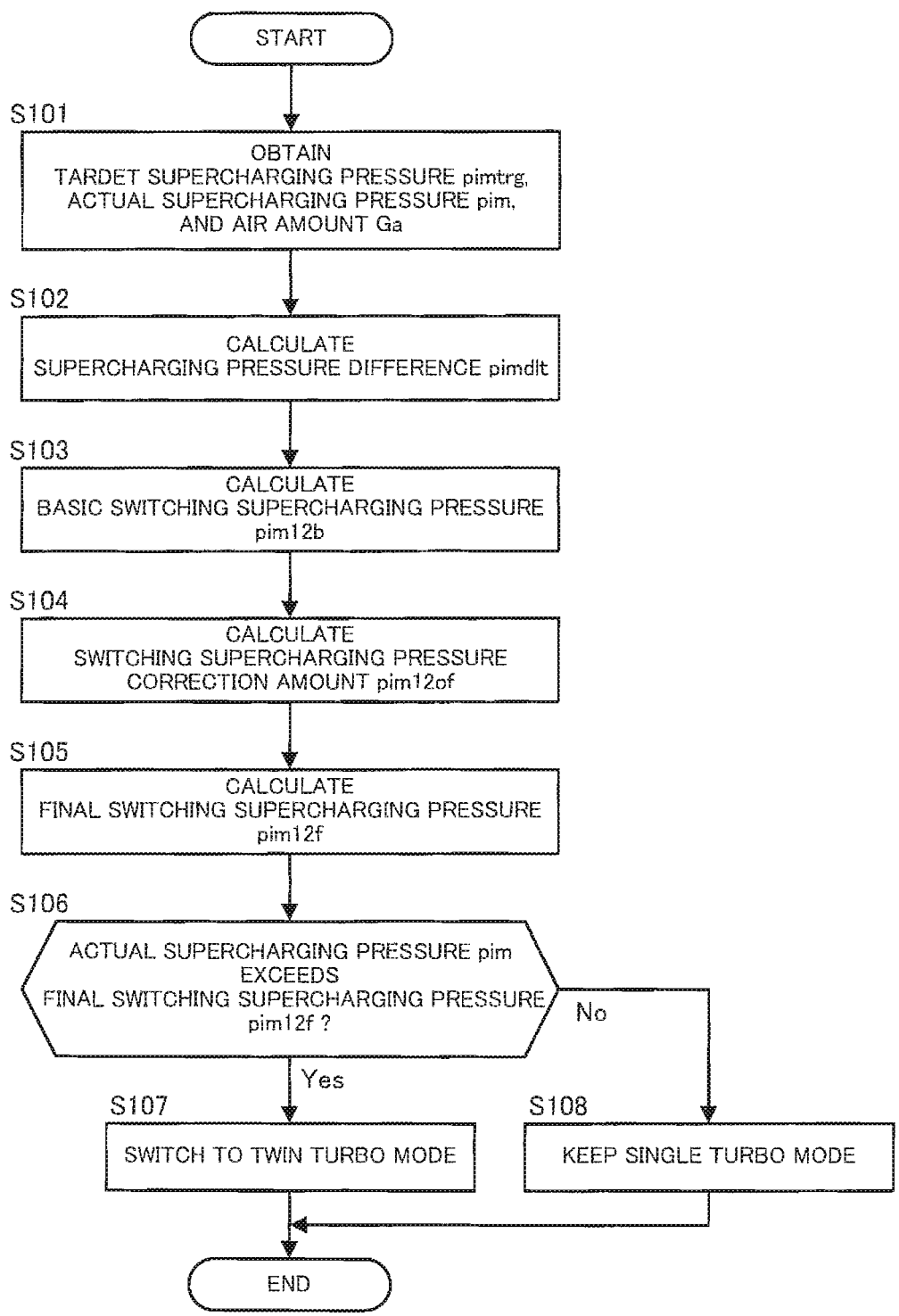

SUPERCHARGER CONTROL DEVICE FOR AN INTERNAL COMBUSTION ENGINE

This is a 371 national phase application of PCT/JP2008/072528 filed 12 Nov. 2008, the content of which is incorporated herein by reference.

TECHNICAL FIELD

The present invention relates to a supercharger control device for an internal combustion engine having two superchargers.

BACKGROUND TECHNIQUE

Conventionally, there is proposed a technique for arranging two superchargers (primary turbocharger and secondary turbocharger) in parallel with each other on an intake system and an exhaust system and for suitably switching the number of the superchargers in operation. Concretely, there is proposed a control which is performed in case of switching between a mode in which only the primary turbocharger is operated and a mode in which both the primary turbocharger and the secondary turbocharger are operated. Hereinafter, the mode in which only the primary turbocharger is operated will be called as "single turbo mode", and the mode in which both the primary turbocharger and the secondary turbocharger are operated will be called as "twin turbo mode".

For example, in Patent Reference-1, there is proposed a technique for determining whether or not an acceleration state is an rapid acceleration based on a number of engine revolution and a throttle opening degree and for making a switching timing earlier at the time of switching from the single turbo mode to the twin turbo, in case of determining that the acceleration state is the rapid acceleration. Additionally, in Patent Reference-2, there is proposed a technique for determining the switching between the single turbo mode and the twin turbo mode, based on a difference between a target supercharging pressure in the single turbo mode set by a driving state and a target supercharging pressure in the twin turbo mode.

Patent Reference-1: Japanese Patent Application Laid-open under No. 5-98976
Patent Reference-2: Japanese Patent Application Laid-open under No. 2008-128129

DISCLOSURE OF INVENTION

Problem to be Solved by the Invention

However, the above techniques described in Patent References 1 and 2 cannot appropriately perform a control of a change of an actual supercharging pressure. Thereby, it is likely that an overshoot of the supercharging pressure occurs.

The present invention has been achieved in order to solve the above problem. It is an object of this invention to provide a supercharger control device for an internal combustion engine capable of appropriately preventing an overshoot of a supercharging pressure in case of switching a mode for operating two superchargers

Means for Solving the Problem

According to one aspect of the present invention, there is provided a supercharger control device for an internal combustion engine having a first supercharger and a second supercharger including: a switching supercharging pressure setting unit which sets a switching supercharging pressure used in case of switching a mode for operating the first supercharger and the second supercharger, based on a difference between a target supercharging pressure and an actual supercharging pressure; and a switching control unit which performs a control of switching the mode when the actual supercharging pressure reaches the switching supercharging pressure.

The above supercharger control device for the internal combustion engine is preferably applied to a system having the first supercharger and the second supercharger. The switching supercharging pressure setting unit sets the switching supercharging pressure used in case of switching the mode for operating the first supercharger and the second supercharger, based on the difference between the target supercharging pressure and the actual supercharging pressure. When the actual supercharging pressure reaches the switching supercharging pressure which is set by above manner, the switching control unit performs the control of switching the mode. By the above supercharger control device for the internal combustion engine, since the switching is performed based on the switching supercharging pressure which is set by comparing the target supercharging pressure with the actual supercharging pressure, it becomes possible to appropriately prevent the overshoot of the supercharging pressure at the time of switching.

In a manner of the above supercharger control device for the internal combustion engine, the switching supercharging pressure setting unit corrects the switching supercharging pressure, based on a difference between a basic switching supercharging pressure which is calculated based on an air amount of the internal combustion engine and the target supercharging pressure. Therefore, it becomes possible to perform the determination and the switching with high accuracy.

In another manner of the above supercharger control device for the internal combustion engine, the switching supercharging pressure setting unit corrects the switching supercharging pressure, based on a driving state of the internal combustion engine. For example, the switching supercharging pressure setting unit performs the correction based on exhaust energy as the driving state of the internal combustion engine. Therefore, it is possible to optimally perform the determination at the time of switching.

Preferably, the above supercharger control device for the internal combustion engine further includes a unit which corrects a valve opening speed or a valve opening timing of an exhaust gas switching valve, and corrects a valve opening speed or a valve opening timing of an intake air switching valve, based on the difference between the target supercharging pressure and the actual supercharging pressure, when the mode is switched. Therefore, it becomes possible to prevent the overshoot of the supercharging pressure and the exhaust pressure more effectively.

Further, preferably, the above supercharger control device for the internal combustion engine further includes a unit which corrects a valve opening speed or a valve opening timing of an exhaust gas switching valve, and corrects a valve opening speed or a valve opening timing of an intake air switching valve, based on a difference between a basic switching supercharging pressure which is calculated based on an air amount of the internal combustion engine and the target supercharging pressure, when the mode is switched. Therefore, it becomes possible to effectively prevent the overshoot of the supercharging pressure and the exhaust pressure, too.

Further, preferably, the above supercharger control device for the internal combustion engine further includes a unit which corrects a valve opening speed or a valve opening timing of an exhaust gas switching valve, and corrects a valve opening speed or a valve opening timing of an intake air switching valve, based on a driving state of the internal combustion engine, when the mode is switched. Therefore, it becomes possible to effectively prevent the overshoot of the supercharging pressure and the exhaust pressure, too.

In a preferred example of the above supercharger control device for the internal combustion engine, the switching supercharging pressure setting unit sets the switching supercharging pressure in case of switching from a mode in which only the first supercharger is operated to a mode in which both the first supercharger and the second supercharger are operated, and the switching control unit performs the control of switching from the mode in which only the first supercharger is operated to the mode in which both the first supercharger and the second supercharger are operated, when the actual supercharging pressure reaches the switching supercharging pressure.

In a preferred example of the above supercharger control device for the internal combustion engine, the first supercharger and the second supercharger are arranged in parallel with each other on an intake air passage and an exhaust passage.

BRIEF DESCRIPTION OF THE DRAWINGS

FIG. 7 is a flowchart showing a control process according to a first embodiment.

BRIEF DESCRIPTION OF THE REFERENCE NUMBER

2 Air Cleaner
3 Intake Air Passage
4, 5 Turbocharger
4a, 5a Compressor
4b, 5b Turbine
6 Intake Air Switching Valve
8 Internal Combustion Engine
8a Cylinder
9 Supercharging Pressure Sensor
10 Exhaust Passage
11 EGR Passage
15 Exhaust Gas Switching Valve
16 Exhaust Gas Bypassing Valve
50 ECU

DETAILED DESCRIPTION OF THE PREFERRED EMBODIMENTS

Preferred embodiments of the present invention will be explained hereinafter with reference to the drawings.

[Device Configuration]

First, the description will be given of an entire configuration of a system to which a supercharger control device for an internal combustion engine according to the embodiment is applied.

Figure 1:
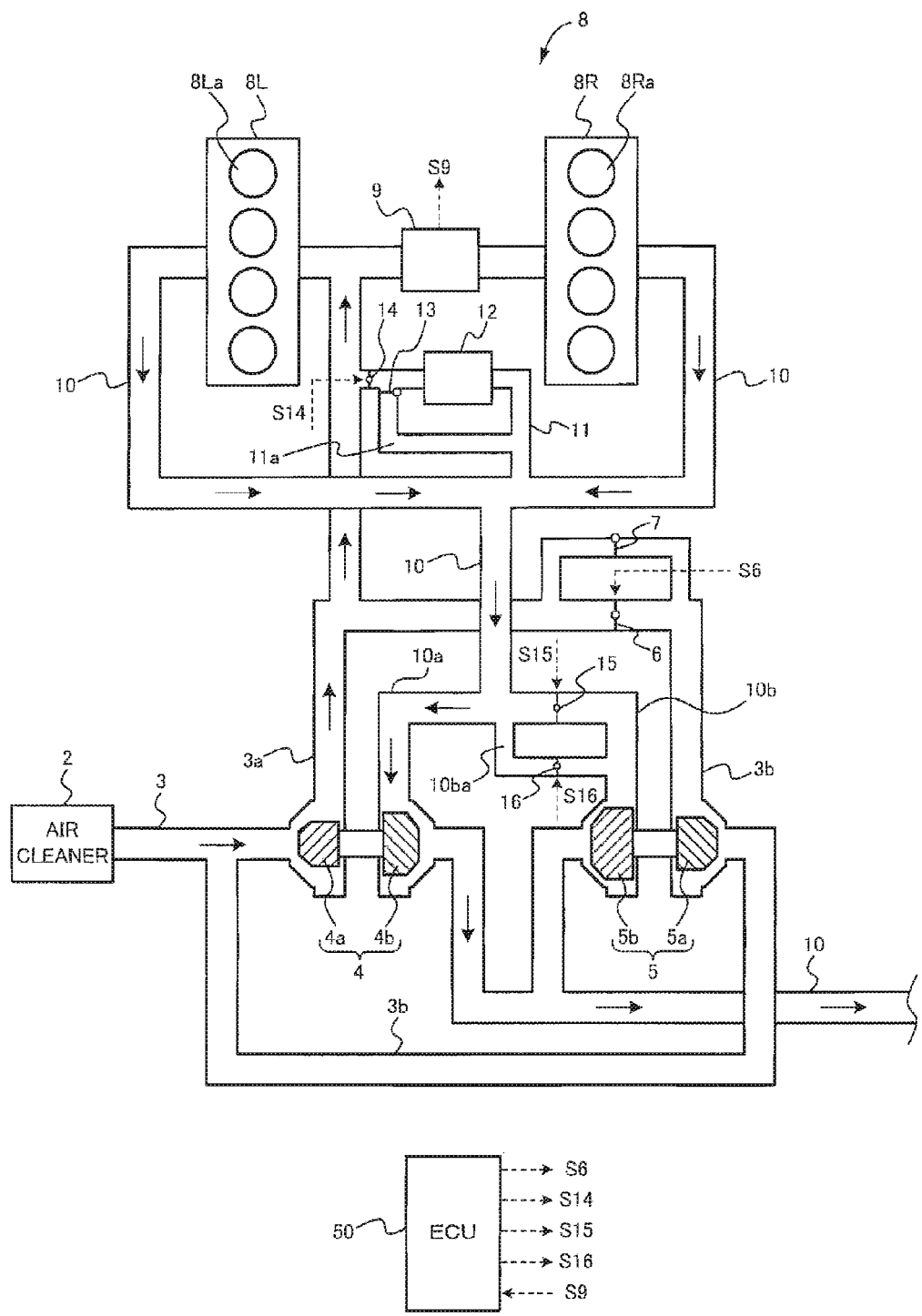
FIG. 1 is a diagram showing a schematic configuration of a vehicle to which the supercharger control apparatus according to an embodiment is applied.

FIG. 1 is a schematic diagram showing a configuration of a vehicle to which the supercharger control device for the internal combustion engine according to the embodiment is applied. In FIG. 1, the solid arrows show the flows of gas and the broken arrows show the input/output of signals. Additionally, in FIG. 1, the flows of gas in case of setting the single turbo mode are shown.

The vehicle mainly includes an air cleaner 2, an intake air passage 3, turbochargers 4, 5, an intake air switching valve 6, a reed valve 7, an internal combustion engine 8, a supercharging pressure sensor 9, an exhaust passage 10, an EGR passage 11, an FGR valve 14, an exhaust gas switching valve 15, an exhaust gas bypassing valve 16 and an ECU (Engine Control Unit) 50.

The air cleaner 2 purifies the air (intake air) obtained from outside and supplies it to the intake air passage 3. The intake air passage 3 branches on its way into the intake air passages 3a, 3b. A compressor 4a of the turbocharger 4 is arranged on the intake air passage 3a, and a compressor 5a of the turbocharger 5 is arranged on the intake air passage 3b. The compressors 4a, 5a compress the intake air passing through the intake air passages 3a, 3b, respectively.

On the intake air passage 3b, the intake air switching valve 6 and the reed valve 7 are provided. The intake air switching valve 6 is configured such that its opening and closing are controlled by the control signal S6 supplied from the ECU 50 and the flow amount of the intake air passing through the intake air passage 3b is adjustable. For example, by opening and closing the intake air switching valve 6, the flow and cutoff of the intake air in the intake air passage 3b can be switched. The reed valve 7 is configured to open when the pressure inside the passage becomes equal to or higher than a predetermined value. Additionally, the supercharging pressure sensor 9 is provided on the intake air passage 3 at the downstream position of the compressors 4a, 4b. The supercharging pressure sensor 9 detects the pressure of the supercharged intake air (actual supercharging pressure) and supplies the detection signal S9 corresponding to the actual supercharging pressure to the ECU 50.

The internal combustion engine 8 is configured as a V-type 8-cylinder engine in which four cylinders 8La, 8Ra are provided on the right and left banks (cylinder groups) 8L, 8R, respectively. The internal combustion engine 8 burns the fuel-air mixture of the intake air and the fuel supplied from the intake air passage 3 to generate power. The internal combustion engine 8 is configured by a gasoline engine or a diesel engine, for example. The exhaust gas generated by the combustion in the internal combustion engine is discharged to the exhaust passage 10. It is noted that the present invention is not limited to the internal combustion engine 8 configured to have 8 cylinders.

The EGR passage 11 is connected to the exhaust passage 10. The EGR passage 11 is connected to the exhaust passage 10 at one end and is connected to the intake air passage 3 at the other end. The EGR passage 11 is a passage for recirculating the exhaust gas (EGR gas) to the intake air system. Concretely, the EGR passage 11 is provided with an EGR cooler 12, an EGR valve 14, a bypass passage 11a and a bypass valve 13. The EGR cooler 12 is a device for cooling the EGR gas. The EGR valve 14 is a valve for adjusting the flow amount of the EGR gas passing through the EGR passage 11, i.e., a valve for adjusting the amount of the EGR gas recirculated to the intake air system (namely, adjusting the EGR rate). In this case, the opening degree of the EGR valve 14 is controlled by the control signal S14 supplied from the ECU 50. The bypass passage 11a is a passage bypassing the EGR cooler 12 and is provided with the bypass valve 13. By the bypass valve 13, the flow amount of the EGR gas passing through the bypass passage 11a is adjusted. In FIG. 1, the EGR valve 14 is closed and the EGR gas is not recirculated.

The exhaust passage 10 branches, on its way, into the exhaust passages 10a, 10b. The turbine 4b of the turbocharger 4 is arranged on the exhaust passage 10a, and the turbine 5b of the turbocharger 5 is arranged on the exhaust passage 10b. The turbines 4b, 5b are rotated by the exhaust gas passing through the exhaust passages 10a, 10b, respectively. The rotational torque of the turbines 4b, 5b are transmitted to the compressor 4a in the turbocharger 4 and the compressor 5a in the turbocharger 5 to rotate them, and thereby the intake air is compressed (i.e., supercharged).

The turbocharger 4 is configured as a low-speed type supercharger of small capacity, having a large supercharging ability in a low to medium speed range. The turbocharger 5 is configured as a high-speed type supercharger of large capacity, having a large supercharging ability in a medium to high speed range. Namely, the turbocharger 4 corresponds to the so-called primary turbocharger and the turbocharger 5 corresponds to the so-called secondary turbocharger. Additionally, the turbocharger 4 corresponds to the first supercharger in the present invention and the turbocharger 5 corresponds to the second supercharger in the present invention.

To the exhaust passage 10b, the exhaust gas switching valve 15 is provided and the exhaust gas bypassing passage 10ba is connected. The opening and closing of the exhaust gas switching valve 15 is controlled by the control signal S15 supplied from the ECU 50, so that the exhaust gas switching valve 15 can adjust the flow amount of the exhaust gas passing through the exhaust passage 10b. For example, by opening and closing the exhaust gas switching valve 15, the flow and cutoff of the exhaust gas in the exhaust passage 10b can be switched. The exhaust gas bypassing passage 10ba is configured as a passage bypassing the exhaust passage 10b provided with the exhaust gas switching valve 15. Specifically, the exhaust gas bypassing passage 10ba has a diameter smaller than that of the exhaust passage 10b provided with the exhaust gas switching valve 15. The exhaust gas bypassing valve 16 is provided in the exhaust gas bypassing passage 10ba, and the flow amount of the exhaust gas passing through the exhaust gas bypassing passage 10ba is adjusted by the exhaust gas bypassing valve 16.

When all of the intake air switching valve 6, the exhaust gas switching valve 15 and the exhaust gas bypassing valve 16 are closed, the intake air and the exhaust gas are supplied only to the turbocharger 4, and the intake air and the exhaust gas are not supplied to the turbocharger 5. Therefore, only the turbocharger 4 operates, and the turbocharger 5 does not operate. On the other hand, when the intake air switching valve 6 is opened and either one of the exhaust gas switching valve 15 and the exhaust gas bypassing valve 16 is opened, the intake air and the exhaust gas are supplied to both of the turbochargers 4, 5. Therefore, both of the turbochargers 4, 5 operate.

The ECU 50 is configured to include a CPU, a ROM, a RAM and an A/C converter, which are not shown. The ECU 50 controls the vehicle based on the outputs supplied from various sensors provided in the vehicle. Specifically, the ECU 50 obtains the actual supercharging pressure from the supercharging pressure sensor 9, and controls the intake air switching valve 6, the EGR valve 14, the exhaust gas switching valve 15 as well as the exhaust gas bypassing valve 16 based on the actual supercharging pressure. In the embodiment, by controlling the intake air switching valve 6, the exhaust gas switching valve 15 and the exhaust gas bypassing valve 16, the ECU 50 mainly performs the control of switching the mode in which only the turbocharger 4 is operated (single turbo mode) and the mode in which both the turbocharger 4 and the turbocharger 5 are operated (twin turbo mode). Thus, the ECU 50 corresponds to the supercharger control device for the internal combustion engine in the present invention. The ECU 50 functions as the switching supercharging pressure setting unit and the switching control unit, which will be described in details, later.

Here, the basic control executed when the single turbo mode and the twin turbo mode are switched will be briefly described. As described above, the mode is switched by the ECU 50 controlling the intake air switching valve 6, the exhaust gas switching valve 15 and the exhaust gas bypassing valve 16. Specifically, when the single turbo mode is switched to the twin turbo mode, the ECU 50 controls the intake air switching valve 6, the exhaust gas switching valve 15 and the exhaust gas bypassing valve 16 from the opened state to the closed state. In this case, the ECU 50 basically opens the exhaust gas bypassing valve 16, the exhaust gas switching valve 15 and the intake air switching valve 6 in this order to execute the switching. More specifically, first the exhaust gas bypassing valve 16 is opened little by little. Then, when a predetermined condition is satisfied in this state, the exhaust gas switching valve 15 is opened little by little, and then the intake air switching valve 6 is opened. In this case, the reason why the exhaust gas bypassing valve 16 is first opened a little is to gradually operate (i.e., runup) the turbocharger 5 by supplying the exhaust gas of relatively small flow amount to the turbocharger 5 (because the diameter of the exhaust gas bypassing passage 10ba is small). In other words, it is prevented that the exhaust gas of relatively large flow amount rushes into the turbocharger 5 to cause a torque shock when the exhaust gas switching valve 15 is opened first. On the other hand, when the single turbo mode is switched to the twin turbo mode, the ECU 50 controls the intake air switching valve 6, the exhaust gas switching valve 15 and the exhaust gas bypassing valve 16 from the opened state to the closed state in a similar manner as described above.

Figure 2A:
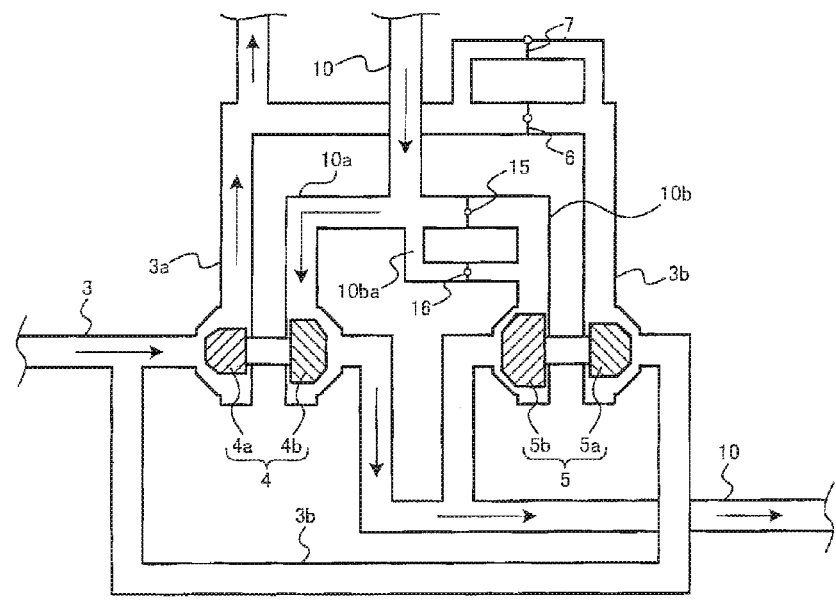
FIGS. 2A and 2B are diagrams showing flows of gas in a single turbo mode and a twin turbo mode.
Figure 2B:
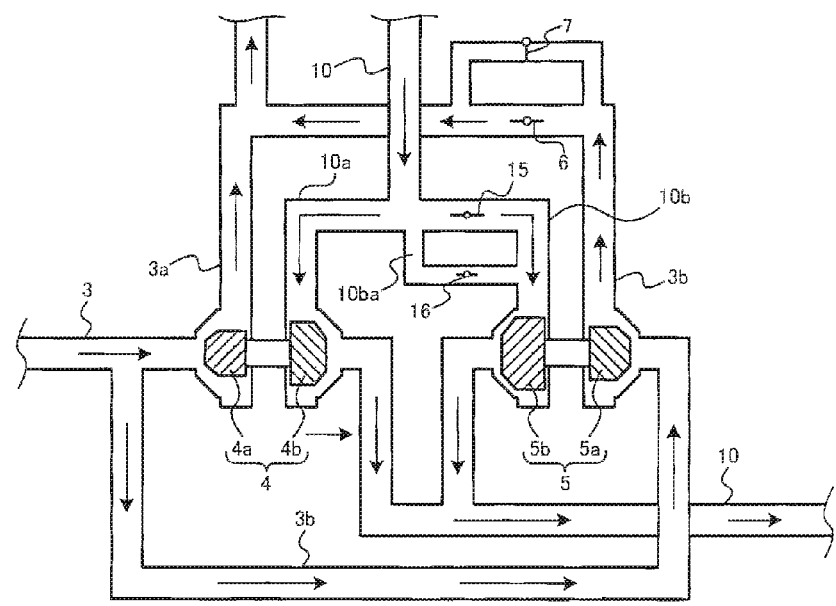

Next, a description will be given of flows of gas in the single turbo mode and the twin turbo mode, with reference to FIGS. 2A and 2B. FIGS. 2A and 2B only show the component near the turbochargers 4, 5 shown in FIG. 1. FIG. 2A shows a diagram at the time of setting the single turbo mode, and FIG. 2B shows a diagram at the time of setting the twin turbo mode. As shown in FIG. 2A, in the single turbo mode, since all of the intake air switching valve 6, the exhaust gas switching valve 15 and the exhaust gas bypassing valve 16 are closed, the intake air and the exhaust gas are supplied only to the turbocharger 4, and the intake air and the exhaust gas are not supplied to the turbocharger 5. Therefore, only the turbocharger 4 operates, and the turbocharger 5 does not operate. On the other hand, as shown in FIG. 2B, in the twin turbo mode, since the intake air switching valve 6 is opened and the exhaust gas switching valve 15 and the exhaust gas bypassing valve 16 are opened, the intake air and the exhaust gas are supplied to both the turbocharger 4 and the turbocharger 5. Therefore, both the turbocharger 4 and the turbocharger 5 operate.

Figure 3:
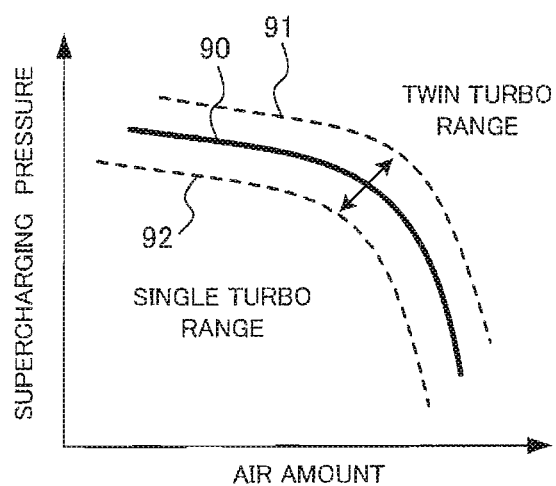
FIG. 3 is a diagram for explaining a fundamental concept of a determination method for switching between a single turbo mode and a twin turbo mode.

Next, a description will be given of a fundamental concept of a determination method for switching between the single turbo mode and the twin turbo mode, with reference to FIG. 3. FIG. 3 shows an example of a map that defines a range (single turbo range) in which the single turbo mode is set and a range (twin turbo range) in which the twin turbo mode is set, by an air amount (horizontal axis) and a supercharging pressure (vertical axis). The solid line 90 corresponds to a determination value used for switching between the single turbo mode and the twin turbo mode. The determination value is changed as shown in a broken line 91 and a broken line 92, in accordance with an acceleration state. The ECU 50 calculates a supercharging pressure corresponding to a present air amount with reference to the map, and sets the supercharging pressure (hereinafter referred to as "basic switching supercharging pressure") to the determination value used for switching between the single turbo mode and the twin turbo mode. Basically, when the actual supercharging pressure exceeds the basic switching supercharging pressure at the time of setting the single turbo mode, the ECU 50 switches from the single turbo mode to the twin turbo mode. In contrast, when the actual supercharging pressure falls below the basic switching supercharging pressure at the time of setting the twin turbo mode, the ECU 50 switches from the twin turbo mode to the single turbo mode.

[Switching Method]

Next, a description will be given of a method for switching from the single turbo mode to the twin turbo mode in the embodiment. In the embodiment, the ECU 50 corrects the basic switching supercharging pressure which is set by the above-mentioned manner (hereinafter, the corrected supercharging pressure will be called as "final switching supercharging pressure"), and performs the switching by using the final switching supercharging pressure as a determination value when the single turbo mode is switched to the twin turbo mode. Hereinafter, a concrete description will be given of a method for setting the final switching supercharging pressure according to the embodiment.

First Embodiment

In the first embodiment, the ECU 50 corrects the above basic switching supercharging pressure based on a difference between the target supercharging pressure and the actual supercharging pressure so as to set the final switching supercharging pressure. The reason for setting the above final switching supercharging pressure is as follows.

Conventionally, in order to prevent the increase of the exhaust resistance (exhaust pressure) and the decrease of the power due to the mechanical delay of the intake air switching valve 6 and/or the exhaust gas switching valve 15, there is a method for determining the rapid acceleration when the number of engine revolution and the opening speed of the throttle opening degree are larger than a predetermined value, for example, and for promptly switching from the single turbo mode to the twin turbo mode. In case of using the above method, since the number of engine revolution and the opening speed of the throttle opening degree which are used for the determination have a relatively low correlation with the increase of the exhaust resistance, it is likely that the switching determination cannot be appropriately performed. This is because it is thought that the increase of the exhaust resistance is mainly caused by the increase of the exhaust energy (such as exhaust gas amount and exhaust gas temperature) rather than the mechanical delay of the intake air switching valve 6 and/or the exhaust gas switching valve 15.

Additionally, since the above method uses only two methods for switching between the rapid acceleration and the acceleration other than the rapid acceleration, it is difficult to appropriately prevent the increase of the exhaust resistance in the various driving states. Additionally, since the method does not appropriately estimate whether or not the exhaust resistance exceeds the finally acceptable exhaust resistance, it is likely that the decrease of the supercharging pressure and the change of the torque occur due to the premature switching. Other than the decrease of the power, the increase of the exhaust resistance can cause the over rotation of the turbocharger 4 (primary turbocharger), the decrease of the reliability of the parts in the exhaust system and the overshoot of the supercharging pressure.

Therefore, in the first embodiment, in order to appropriately prevent the overshoot of the supercharging pressure, the ECU 50 sets the determination value used for switching from the single turbo mode to the twin turbo mode, to an appropriate value. Concretely, the ECU 50 corrects the basic switching supercharging pressure based on the difference between the target supercharging pressure and the actual supercharging pressure so as to set the final switching supercharging pressure, and uses the final switching supercharging pressure as the determination value when the single turbo mode is switched to the twin turbo mode.

The target supercharging pressure is the target value of the control which is preliminarily confirmed in the steady state, and the actual supercharging pressure basically becomes the same as the target supercharging pressure in the course of time. For example, the target supercharging pressure is calculated by an arithmetic expression or a map which is defined based on the driving state (such as the number of engine revolution and the fuel injection amount) of the vehicle.

Here, a concrete description will be given of a method for setting the final switching supercharging pressure in the first embodiment, with reference to FIGS. 4 to 6.

Figure 4:
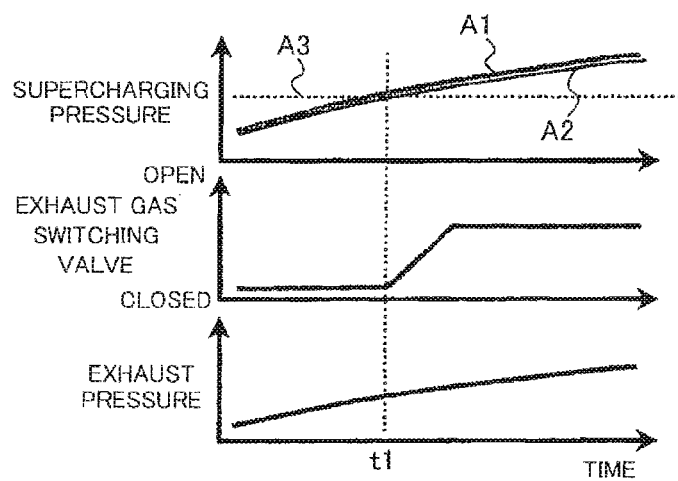
FIG. 4 is a diagram showing an example of a behavior at the time of switching during slow acceleration.

FIG. 4 shows a diagram of an example of a behavior when the single turbo mode is switched to the twin turbo mode at the time of slow acceleration. FIG. 4 shows a graph in case of not performing the control according to the first embodiment (i.e., in case of not correcting the basic switching supercharging pressure). Concretely, FIG. 4 shows a time change of the supercharging pressure, the opening and closing of the exhaust gas switching valve 15 and the exhaust pressure (corresponding to the pressure of the exhaust gas. The same will apply hereinafter), in descending order. Specifically, a solid line A1 shows the target supercharging pressure, and a solid line A2 shows the actual supercharging pressure, and a broken line A3 shows the basic switching supercharging pressure (not corrected determination value) used for switching from the single turbo mode to the twin turbo mode. Even if the control according to the first embodiment is performed, since there is almost no difference between the target supercharging pressure and the actual supercharging pressure in this case and the basic switching supercharging pressure is scarcely corrected, eventually the same graph as the graph shown in FIG. 4 is obtained, As shown in FIG. 4, since the actual supercharging pressure exceeds the basic switching supercharging pressure at time t1, the control of switching from the single turbo mode to the twin turbo mode is performed. In this case, it can be understood that the overshoot of the supercharging pressure and the exhaust pressure does not occur. This is because it is thought that the difference between the target supercharging pressure and the actual supercharging pressure scarcely occurs due to the slow acceleration.

Figure 5:
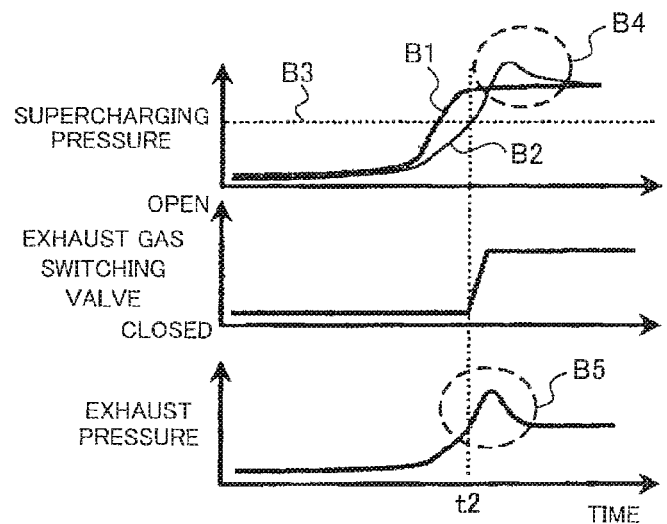
FIG. 5 is a diagram showing an example of a behavior at the time of switching during rapid acceleration.

FIG. 5 shows a diagram of an example of a behavior when the single turbo mode is switched to the twin turbo mode at the time of rapid acceleration. FIG. 5 shows a graph in case of not performing the control according to the first embodiment (i.e., in case of not correcting the basic switching supercharging pressure). Concretely, FIG. 5 shows a time change of the supercharging pressure, the opening and closing of the exhaust gas switching valve 15 and the exhaust pressure, in descending order. Specifically, a solid line B1 shows the target supercharging pressure, and a solid line B2 shows the actual supercharging pressure, and a broken line 33 shows the basic switching supercharging pressure (not corrected determination value)

As shown in FIG. 5, since the actual supercharging pressure exceeds the basic switching supercharging pressure at time t2, the control of switching from the single turbo mode to the twin turbo mode is performed. In this case, as shown by areas 34, 35 drawn in broken lines, it can be understood that the overshoot of the supercharging pressure and the exhaust pressure occurs. This is because it is thought that some large difference between the target supercharging pressure and the actual supercharging pressure occurs due to the rapid acceleration. Namely, this is because it is thought that the actual supercharging pressure cannot follow the target supercharging pressure.

Thus, in the first embodiment, in order to appropriately prevent the above overshoot of the supercharging pressure, the ECU 50 corrects the basic switching supercharging pressure based on the difference (hereinafter simply referred to as "supercharging pressure difference") between the target supercharging pressure and the actual supercharging pressure so as to set the final switching supercharging pressure. Concretely, the ECU 50 sets the final switching supercharging pressure lower as the supercharging pressure difference becomes larger, and sets the final switching supercharging pressure higher as the supercharging pressure difference becomes smaller.

Figure 6:
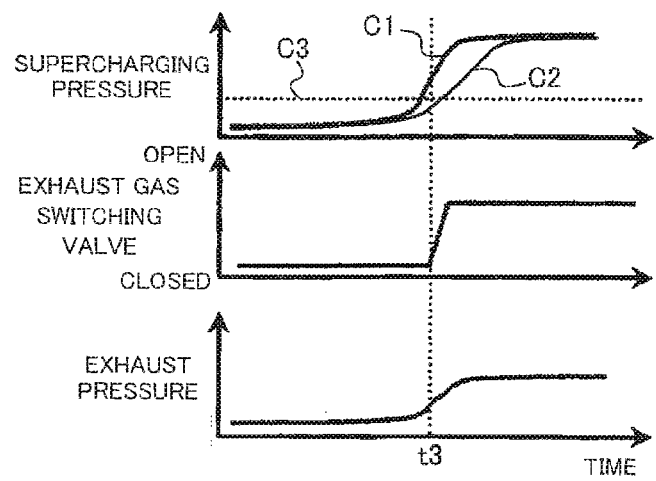
FIG. 6 is a diagram showing an example of a behavior at the time of switching during rapid acceleration, in case of performing a control according to a first embodiment.

FIG. 6 shows a diagram of an example of a behavior when the single turbo mode is switched to the twin turbo mode at the time of rapid acceleration, in case of performing the control according to the first embodiment. Concretely, FIG. 6 shows a time change of the supercharging pressure, the opening and closing of the exhaust gas switching valve 15 and the exhaust pressure, in descending order Specifically, a solid line C1 shows the target supercharging pressure and a solid line C2 shows the actual supercharging pressure. Additionally, a broken line C3 shows the final switching supercharging pressure after the basic switching supercharging pressure is corrected based on the supercharging pressure difference. In this case, since the actual supercharging pressure tends to depart from the target supercharging pressure due to the rapid acceleration (i.e., the difference between the target supercharging pressure and the actual supercharging pressure tends to become larger), the final switching supercharging pressure is set relatively low. Namely, the final switching supercharging pressure shown by the broken line C3 is set lower than the basic switching supercharging pressure shown by the broken line B3 in FIG. 5.

In case of setting the above final switching supercharging pressure, since the actual supercharging pressure exceeds the final switching supercharging pressure at time t3, the control of switching from the single turbo mode to the twin turbo mode is performed. In this case, it can be understood that the overshoot of the supercharging pressure and the exhaust pressure does not occur. This is because the switching is performed by the appropriate determination value (final switching supercharging pressure) in accordance with the acceleration state.

Next, FIG. 7 is a flowchart showing a control process according to the first embodiment. The process is performed at the time of setting the single turbo mode. The process is repeatedly performed by the ECU 50 in a predetermined cycle.

First, in step S101, the ECU 50 obtains the target supercharging pressure pimtrg, the actual supercharging pressure pim and the air amount Ga. Concretely, the ECU 50 obtains the target supercharging pressure pimtrg by using an arithmetic expression or a map which is defined based on the driving state (such as the number of engine revolution and the fuel injection amount) of the vehicle. Additionally, the ECU 50 obtains the actual supercharging pressure pim from the supercharging pressure sensor 9 and obtains the air amount Ga from the air flow meter. Then, the process goes to step S102. The target supercharging pressure pimtrg is the target value of the control which is preliminarily confirmed in the steady state, and the actual supercharging pressure pim basically becomes the same as the target supercharging pressure pimtrg in the course of time.

In step S102, the ECU 50 calculates the supercharging pressure difference pimdlt from the target supercharging pressure pimtrg and the actual supercharging pressure pim which are obtained in step S101. Concretely, the supercharging pressure difference pimdlt is calculated by "pimdlt=pimtrg−pim". Then, the process goes to step S103.

In step S103, the ECU 50 calculates the basic switching supercharging pressure pim12b from the air amount Ga obtained in step S101. Then, the process goes to step S104. In step S104, the ECU 50 calculates a switching supercharging pressure correction amount pim12of for correcting the basic switching supercharging pressure pim12b, based on the supercharging pressure difference pimdlt calculated in step S102. Then, the process goes to step S105.

Figure 8A:
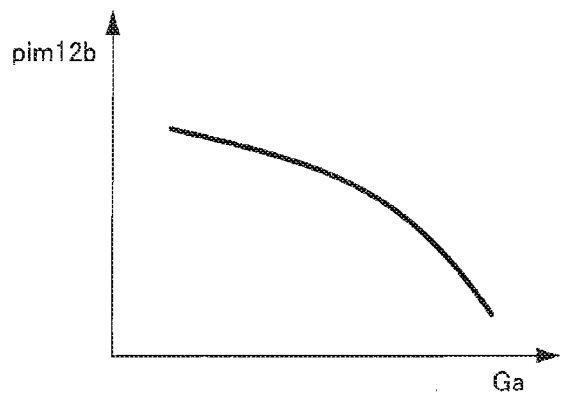
FIGS. 8A and 8B are diagrams for explaining a calculating method of a basic switching supercharging pressure and a switching supercharging pressure correction amount in a first embodiment.

Here, a description will be given of an example of a calculating method of the basic switching supercharging pressure pim12b and the switching supercharging pressure correction amount pim12of, with reference to FIGS. 8A and 8B. FIG. 8A shows an example of a map of the basic switching supercharging pressure pim12b (vertical axis) which is defined by the air amount Ga (horizontal axis). As shown in FIG. 8A, it can be understood that the basic switching supercharging pressure pim12b becomes lower as the air amount Ga becomes larger. In the above step S103, the ECU 50 obtains the basic switching supercharging pressure pim12b corresponding to the air amount Ga, with reference to the map.

Figure 8B:
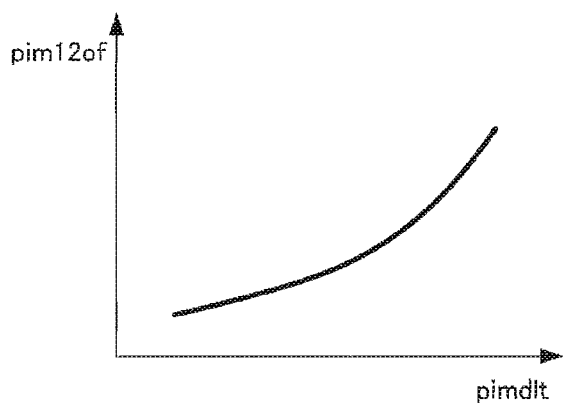

FIG. 8B shows an example of a map of the switching supercharging pressure correction amount pim12of (vertical axis) which is defined by the supercharging pressure difference pimdlt (horizontal axis). As shown in FIG. 8B, it can be understood that the switching supercharging pressure correction amount pim12of becomes larger as the supercharging pressure difference pimdlt becomes larger. In the above step S104, the ECU 50 obtains the switching supercharging pressure correction amount pim12of corresponding to the supercharging pressure difference pimdlt, with reference to the map.

By going back to FIG. 7, a description will be given of processes after step S105. In step S105, the ECU 50 calculates the final switching supercharging pressure pim12f. Concretely, the ECU 50 obtains the final switching supercharging pressure pim12f by correcting the basic switching supercharging pressure pim12b calculated in step S103, based on the switching supercharging pressure correction amount pim12of calculated in step S104. In details, the ECU 50 calculates "pim12f=pim12b−pim12of". Then, the process goes to step S106.

In step S106, the ECU 50 determines whether or not it is the situation to switch from the single turbo mode to the twin turbo mode. Concretely, the ECU 50 determines whether or not the actual supercharging pressure pim exceeds the final switching supercharging pressure pim12f calculated in step S105. When the actual supercharging pressure pim exceeds the final switching supercharging pressure pim12f (step S106; Yes), the process goes to step S107. In this case, the ECU 50 switches from the single turbo mode to the twin turbo mode (step S107). Then, the process ends.

In contrast, when the actual supercharging pressure pim does not exceed the final switching supercharging pressure pim12f (step S106; No), the process goes to step S108. In this case, the ECU 50 keeps the single turbo mode (step S108). Then, the process ends.

According to the above-mentioned first embodiment, it becomes possible to appropriately prevent the overshoot of the supercharging pressure when the single turbo mode is switched to the twin turbo mode at the time of the rapid acceleration Second Embodiment Next, a description will be given of a second embodiment. The second embodiment is different from the first embodiment in that the basic switching supercharging pressure is corrected so as to set the final switching supercharging pressure, in consideration of not only the difference between the target supercharging pressure and the actual supercharging pressure but also a difference between the target supercharging pressure and the basic switching supercharging pressure. The reason for setting the above final switching supercharging pressure is that, by the correction of the basic switching supercharging pressure based on only the supercharging pressure difference, it becomes difficult to correlate with the determination value which should be used for actually switching and the accuracy sometimes decreases, because the difference from the slow acceleration is estimated and the switching tends to be determined early.

Figure 9:
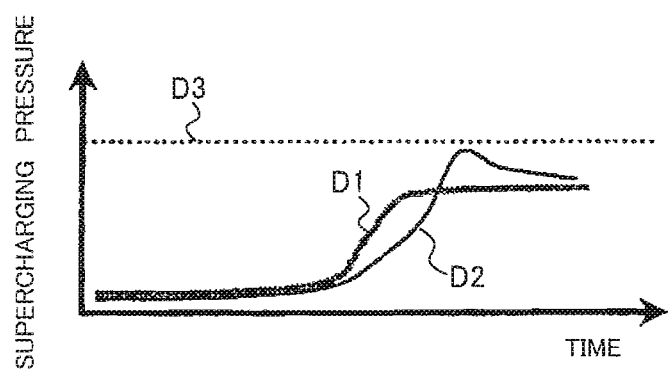
FIG. 9 shows a diagram in such a case that an actual supercharging pressure overshoots a target supercharging pressure.

A concrete description will be given, with reference to FIG. 9. In FIG. 9, the horizontal axis indicates time, and the vertical axis indicates the supercharging pressure. Concretely, a solid line D1 shows the target supercharging pressure, and a solid line D2 shows the actual supercharging pressure, and a broken line D3 shows the supercharging pressure (corresponding to the basic switching supercharging pressure) used for the switching determination. In this case, it can be understood that the actual supercharging pressure overshoots the target supercharging pressure. By the method according to the first embodiment, even if the above overshoot occurs, the switching is not basically performed unless the actual supercharging pressure exceeds the supercharging pressure used for the switching determination.

Here, since the target supercharging pressure is the target value of the control which is preliminarily confirmed in the steady state, it can be said that it is possible to certainly determine that the switching is necessary at a later time if the target supercharging pressure exceeds the supercharging pressure used for the switching determination. Namely, when a difference between the target supercharging pressure and the supercharging pressure (basic switching supercharging pressure) used for the switching determination is large, it is estimated that the actual supercharging pressure immediately exceeds the supercharging pressure used for the switching determination, too.

Therefore, in the second embodiment, the basic switching supercharging pressure is corrected so as to set the final switching supercharging pressure, in consideration of not only the difference between the target supercharging pressure and the actual supercharging pressure but also the difference between the target supercharging pressure and the basic switching supercharging pressure. Namely, the overshoot part of the supercharging pressure is merely corrected in the first embodiment, but a margin against the determination value as well as the above overshoot part of the supercharging pressure is corrected in the second embodiment.

Concretely, in the second embodiment, the ECU 50 sets the final switching supercharging pressure lower as the difference between the target supercharging pressure and the basic switching supercharging pressure becomes larger, and sets the final switching supercharging pressure higher as the difference between the target supercharging pressure and the basic switching supercharging pressure becomes smaller. For example, when the target supercharging pressure exceeds the basic switching supercharging pressure and the delay of the supercharging pressure is large, the ECU 50 sets a correction amount for correcting the basic switching supercharging pressure larger and switches from the single turbo mode to the twin turbo mode early. In contrast, when the target supercharging pressure does not exceeds the basic switching supercharging pressure and the delay of the supercharging pressure is small, the ECU 50 sets the correction amount for correcting the basic switching supercharging pressure smaller (for example, the correction amount is set to "0"), and switches from the single turbo mode to the twin turbo mode as usual.

Figure 10:
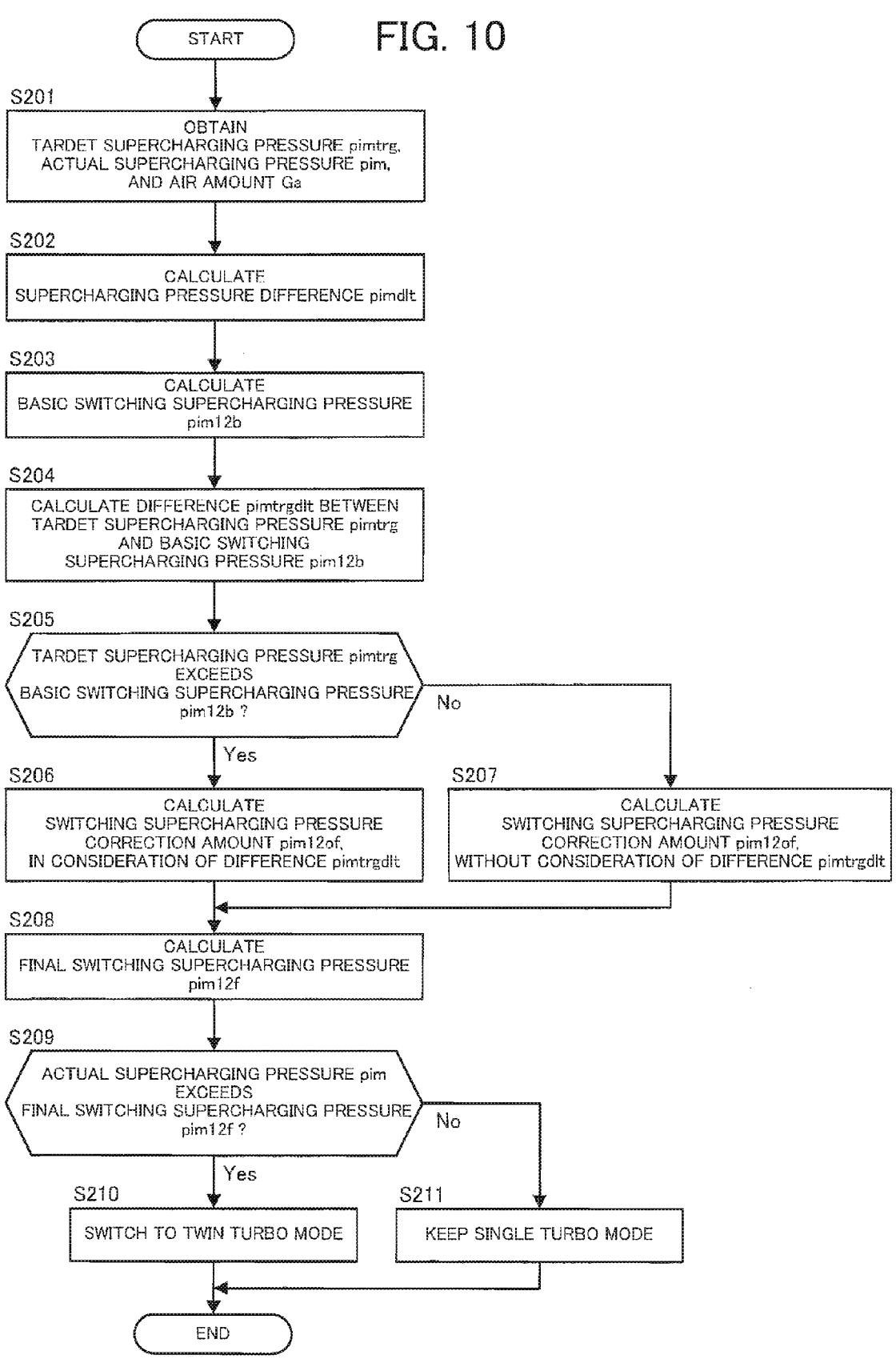
FIG. 10 is a flowchart showing a control process according to a second embodiment.

Next, FIG. 10 is a flowchart showing a control process according to the second embodiment. The process is performed at the time of setting the single turbo mode. The process is repeatedly performed by the ECU 50 in a predetermined cycle.

Since processes in steps S201 to S203 and processes in steps S208 to S211 are similar to the processes in steps S101 to S103 and the processes in steps S105 to S108 which are shown in FIG. 7, explanations thereof are omitted. Here, a description will only be given of processes in steps S204 to S207.

In step S204, the ECU 50 calculates the difference pimtrgdlt between the target supercharging pressure pimtrg obtained in step S201 and the basic switching supercharging pressure pim12b obtained in step S203. Then, the process goes to step S205.

In step S205, the ECU 50 determines whether or not the target supercharging pressure pimtrg exceeds the basic switching supercharging pressure pim12b. When the target supercharging pressure pimtrg exceeds the basic switching supercharging pressure pim12b (step S205; Yes), the process goes to step S206. In this case, since it is estimated that the actual supercharging pressure pim immediately exceeds the basic switching supercharging pressure pim12b, it can be said that the switching supercharging pressure correction amount pim12of should be calculated in consideration of the difference pimtrgdlt. In contrast, when the target supercharging pressure pimtrg does not exceed the basic switching supercharging pressure pim12b (step S205; No), the process goes to step S207. In this case, since it is hard to estimate that the actual supercharging pressure pim immediately exceeds the basic switching supercharging pressure pim12b, it cannot be said that the switching supercharging pressure correction amount pim12of should be calculated in consideration of the difference pimtrgdlt.

In step S206, the ECU 50 calculates the switching supercharging pressure correction amount pim12of in consideration of the difference pimtrgdlt. Concretely, the ECU 50 calculates the switching supercharging pressure correction amount pim12of based on the supercharging pressure difference pimdlt calculated in step S202 and the difference pimtrgdlt calculated in step S204. Then, the process goes to step S208.

In contrast, in step S207, the ECU 50 calculates the switching supercharging pressure correction amount pim12of without consideration of the difference pimtrgdlt calculated in step S204. Concretely, by the method indicated in the first embodiment, the ECU 50 calculates the switching supercharging pressure correction amount pim12of based on the supercharging pressure difference pimdlt (see the process in step S104 shown in FIG. 7 and FIG. 8B). Then, the process goes to step S208. It is not limited that the basic switching supercharging pressure pim12b is corrected by the switching supercharging pressure correction amount pim12of calculated by the above manner, when the target supercharging pressure pimtrg does not exceed the basic switching supercharging pressure pim12b. The basic switching supercharging pressure pim12b may be directly used as the final switching supercharging pressure pim12f.

Figure 11:
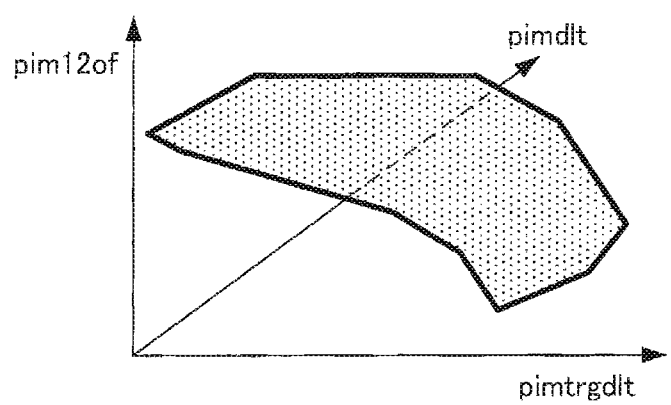
FIG. 11 is a diagram for explaining a calculating method of a switching supercharging pressure correction amount in a second embodiment.

Here, a description will be given of an example of a calculating method of the switching supercharging pressure correction amount pim12of according to the second embodiment, with reference to FIG. 11. FIG. 11 shows an example of a map (two-dimensional map) of the switching supercharging pressure correction amount pim12of which is defined by the supercharging pressure difference pimdlt and the difference pimtrgdlt. In the above step S206, the ECU 50 obtains the switching supercharging pressure correction amount pim12of corresponding to the supercharging pressure difference pimdlt and the difference pirntrgdlt, with reference to the map.

According to the above-mentioned second embodiment, by setting the final switching supercharging pressure in consideration of the difference between the target supercharging pressure and the basic switching supercharging pressure, it becomes possible to perform the determination and the switching with high accuracy when the single turbo mode is switched to the twin turbo mode.

Third Embodiment

Next, a description will be given of a third embodiment. The third embodiment is different from the first and second embodiments in that the basic switching supercharging pressure is corrected so as to set the final switching supercharging pressure, in consideration of not only the difference between the target supercharging pressure and the actual supercharging pressure and the difference between the target supercharging pressure and the basic switching supercharging pressure but also the driving state of the internal combustion engine 8. Concretely, in the third embodiment, the final switching supercharging pressure is set in consideration of the exhaust energy as the driving state of the internal combustion engine 8. The reason for setting the above final switching supercharging pressure is that, by the correction of the basic switching supercharging pressure based on only the parameter associated with the supercharging pressure, it is difficult to correlate with the exhaust energy which is the immediate cause of the overshoot of the supercharging pressure. Namely, even if the difference between the target supercharging pressure and the actual supercharging pressure is same or the difference between the target supercharging pressure and the basic switching supercharging pressure is same, the correction amount for correcting the basic switching supercharging pressure is sometimes different due to the difference of the exhaust energy.

Therefore, in the third embodiment, the basic switching supercharging pressure is corrected so as to set the final switching supercharging pressure, in consideration of not only the difference between the target supercharging pressure and the actual supercharging pressure and the difference between the target supercharging pressure and the basic switching supercharging pressure but also the exhaust energy. In other words, in the third embodiment, the correction amount for correcting the basic switching supercharging pressure is varied by the exhaust energy. Concretely, the ECU 50 corrects the basic switching supercharging pressure in consideration of the difference of the exhaust energy, based on the air amount and the fuel injection amount. This is because the air amount and the fuel injection amount have a high correlation with the exhaust energy. In details, when the air amount is high and the fuel injection amount is high, the ECU 50 sets the correction amount for correcting the basic switching supercharging pressure larger.

Figure 12:
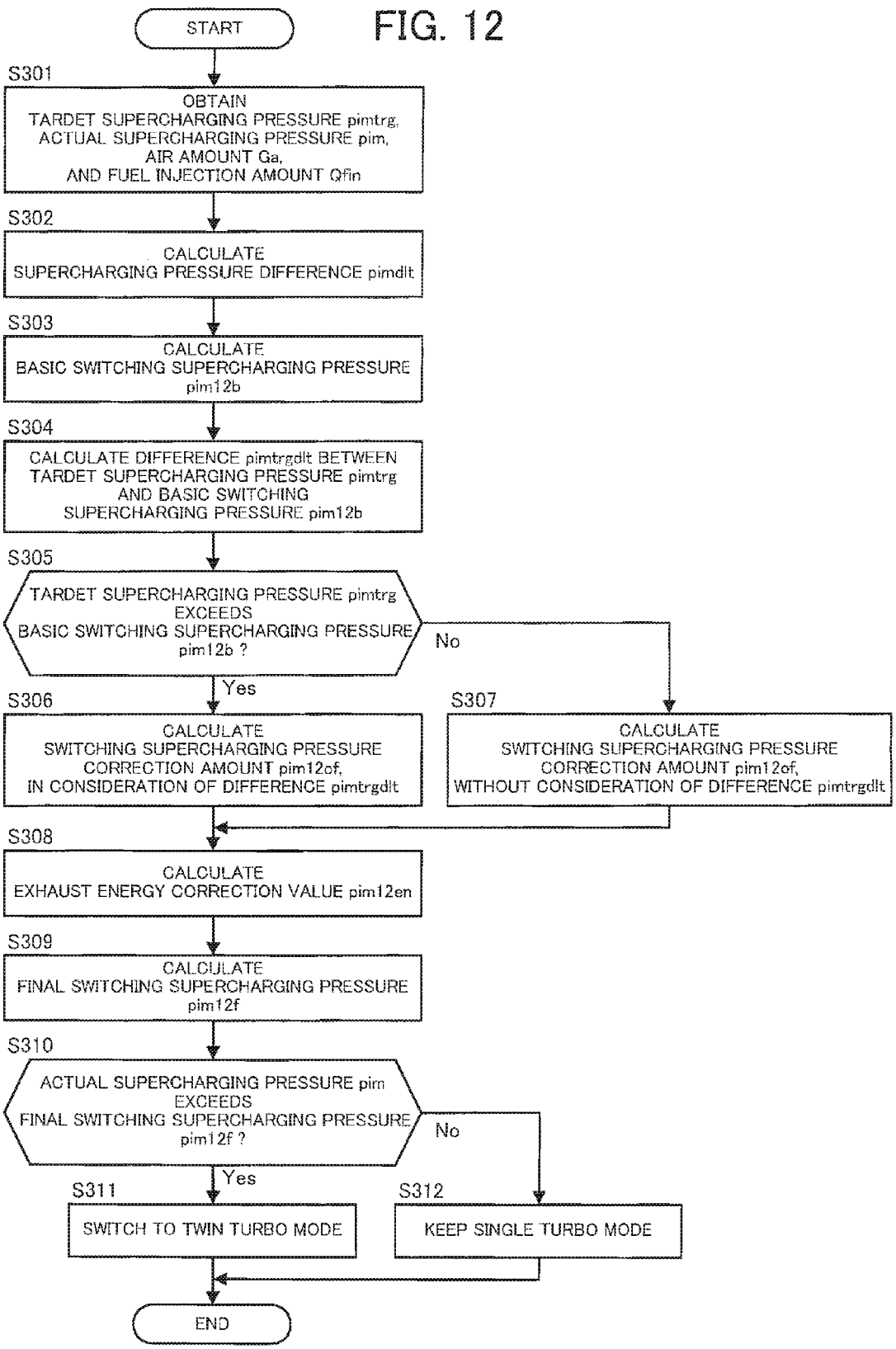
FIG. 12 is a flowchart showing a control process according to a third embodiment.

Next, FIG. 12 is a flowchart showing a control process according to the third embodiment. The process is performed at the time of setting the single turbomode. The process is repeatedly performed by the ECU 50 in a predetermined cycle.

Since processes in steps S301 to S307 and processes in steps S310 to S312 are roughly similar to the processes in steps S201 to S207 and the processes in steps S209 to S211 which are shown in FIG. 10, explanations thereof are omitted. Here, a description will only be given of processes in steps S308 and S309.

In step S308, the ECU 50 calculates an exhaust energy correction value pim12en for correcting the basic switching supercharging pressure pim12b by the exhaust energy, based on the air amount Ga and the fuel injection amount Qfin which are obtained in step S301. Then, the process goes to step S309.

In step S309, the ECU 50 calculates the final switching supercharging pressure pim12f. Concretely, the ECU 50 corrects the basic switching supercharging pressure pim12b calculated in step S303, based on the switching supercharging pressure correction amount pim12of calculated in step S306 or step S307 and the exhaust energy correction value pim12en calculated in step S308, in order to obtain the final switching supercharging pressure pim12f. In details, the ECU 50 calculates "pim12f=pim12b−(pim12of*pim12en)". Then, the process goes to step S310.

Figure 13:
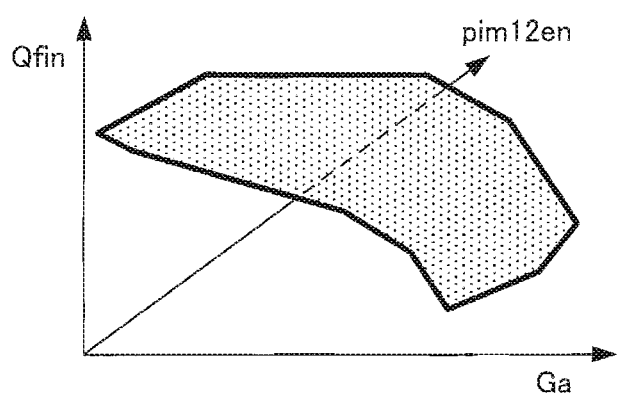
FIG. 13 is a diagram for explaining a calculating method of an exhaust energy correction value in a third embodiment.

Here, a description will be given of an example of a calculating method of the exhaust energy correction value pim12en according to the third embodiment, with reference to FIG. 13. FIG. 13 shows an example of a map (two-dimensional map) of the exhaust energy correction value pim12en which is defined by the air amount Ga and the fuel injection amount Qfin. In the above step S308, the ECU 50 obtains the exhaust energy correction value pim12en corresponding to the air amount Ga and the fuel injection amount Qfin, with reference to the map.

According to the above-mentioned third embodiment, by setting the final switching supercharging pressure in consideration of the exhaust energy, it is possible to optimally perform the determination when the single turbo mode is switched to the twin turbo mode.

In the above embodiment, such an example that the basic switching supercharging pressure is corrected in consideration of the difference of the exhaust energy based on the difference between the air amount and the fuel injection amount is shown. Besides the air amount and the fuel injection amount, the basic switching supercharging pressure may be corrected based on the exhaust gas temperature. This is because the exhaust gas temperature has a high correlation with the exhaust energy, too.

Additionally, in the above embodiment, while such an example that the basic switching supercharging pressure is corrected so as to set the final switching supercharging pressure, based on the difference between the target supercharging pressure and the actual supercharging pressure, the difference between the target supercharging pressure and the basic switching supercharging pressure and the driving state (exhaust energy) of the internal combustion engine 8 is shown, it is not limited to this. As another example, without consideration of the difference between the target supercharging pressure and the basic switching supercharging pressure, the basic switching supercharging pressure can be corrected so as to set the final switching supercharging pressure, based on the difference between the target supercharging pressure and the actual supercharging pressure and the driving state (exhaust energy) of the internal combustion engine 8.

Fourth Embodiment

Next, a description will be given of a fourth embodiment. The fourth embodiment is different from the first to third embodiments in that an operation manner of the exhaust gas switching valve 15 and the intake air switching valve 6 is changed, when the single turbo mode is switched to the twin turbo mode. Concretely, in the fourth embodiment, the ECU 50 sets the final switching supercharging pressure by any one of the methods indicated in the first to third embodiments, and corrects a valve opening speed of the exhaust gas switching valve 15 and a valve opening timing of the intake air switching valve 6, when the single turbo mode is switched to the twin turbo mode.

The reason is as follows. Basically, in order to gradually operate the turbocharger 5 (secondary turbocharger) when the single turbo mode is switched to the twin turbo mode, first the exhaust gas switching valve 15 is opened, and then the intake air switching valve 6 is opened after waiting the state in which the turbocharger 5 can adequately perform the supercharging. While only the basic switching supercharging pressure is corrected in the first to third embodiments, it is thought that it is preferable that the operation manner of the exhaust gas switching valve 15 and the intake air switching valve 6 is changed at the time of the switching in order to effectively prevent the increase of the exhaust pressure and prevent the torque level difference at the time of the switching. Therefore, in the fourth embodiment, when the single turbo mode is switched to the twin turbo mode, the valve opening speed of the exhaust gas switching valve 15 and the valve opening timing of the intake air switching valve 6 are corrected.

Here, a concrete description will be given of a control method according to the fourth embodiment, with reference to FIGS. 14 and 15.

Figure 14:
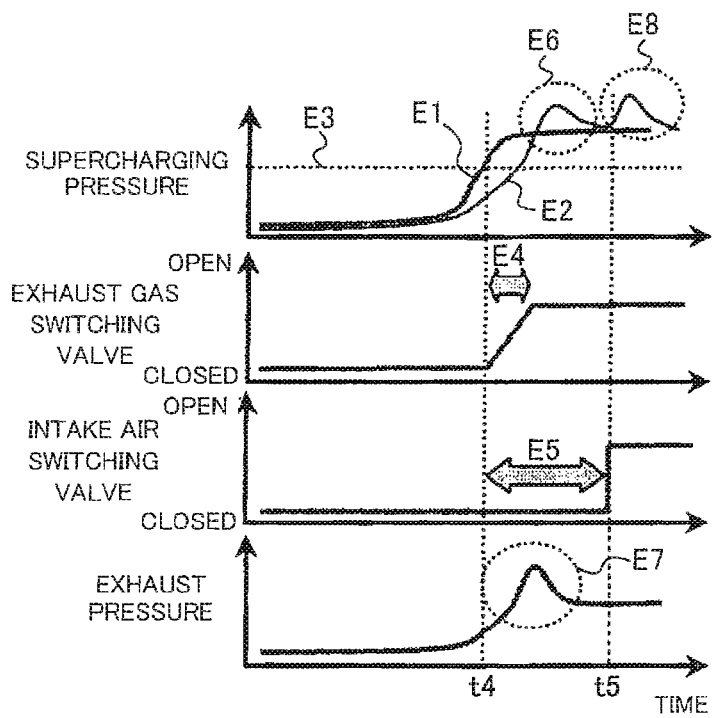
FIG. 14 is a diagram showing an example of a behavior at the time of switching during rapid acceleration.

FIG. 14 shows a diagram of an example of a behavior when the single turbo mode is switched to the twin turbo mode at the time of rapid acceleration. FIG. 14 shows a graph in case of not correcting the valve opening speed of the exhaust gas switching valve 15 and the valve opening timing of the intake air switching valve 6. Concretely, FIG. 14 shows a time change of the supercharging pressure, the opening and closing of the exhaust gas switching valve 15, the opening and closing of the intake air switching valve 6 and the exhaust pressure, in descending order. Specifically, a solid line E1 shows the target supercharging pressure, and a solid line E2 shows the actual supercharging pressure, and a broken line E3 shows the basic switching supercharging pressure (not corrected determination value by the above manner) Additionally, in this case, the exhaust gas switching valve 15 is opened at the valve opening speed as shown by an arrow 54, and the intake air switching valve 6 is opened at the valve opening timing as shown by an arrow 55. The valve opening speed and the valve opening timing are the values normally used.

As shown in FIG. 14, at time t4, the control of switching from the single turbo mode to the twin turbo mode is performed. In this case, as shown by areas E6, E7 drawn in broken lines, it can be understood that the overshoot of the supercharging pressure and the exhaust pressure occurs. This is because it is thought that the valve opening speed of the exhaust gas switching valve 15 is slow. Additionally, as shown by an area E8 drawn in a broken line, it can be understood that the overshoot of the supercharging pressure occurs at the valve opening timing (concretely, at time t5) of the intake air switching valve 6. This is because it is thought that the valve opening timing of the intake air switching valve 6 is late.

Therefore, in the fourth embodiment, when the single turbo mode is switched to the twin turbo mode, the ECU 50 performs the correction so that the valve opening speed of the exhaust gas switching valve 15 becomes faster, in order to increase the amount of the bypassing gas and prevent the overshoot of the supercharging pressure and the exhaust pressure. Additionally, when the switching is performed, the ECU 50 performs the correction so that the valve opening timing of the intake air switching valve 6 becomes earlier, i.e., the waiting time until the opening of the intake air switching valve 6 is shortened, in order to prevent the overshoot of the supercharging pressure at the time of switching to the twin turbo mode.

Figure 15:
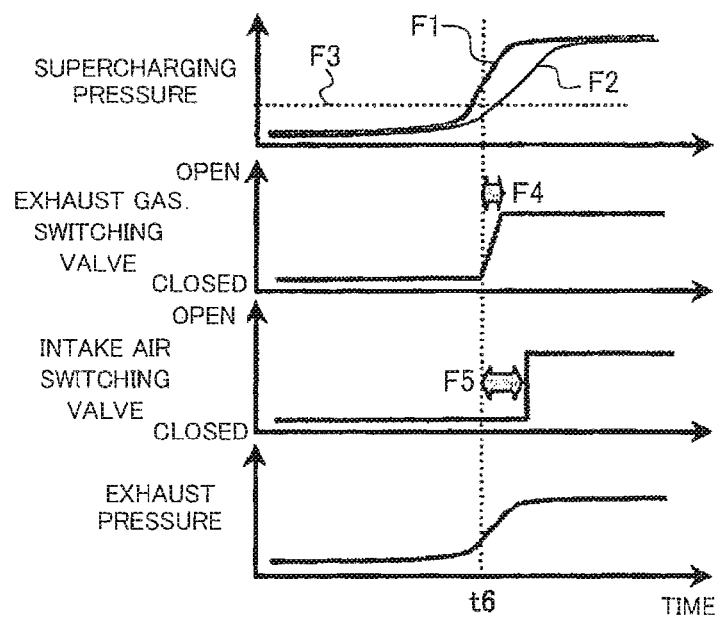
FIG. 15 is a diagram showing an example of a behavior of rapid acceleration at the time of switching, in case of performing a control according to a fourth embodiment.

FIG. 15 shows a diagram of an example of a behavior when the single turbo mode is switched to the twin turbo mode at the time of rapid acceleration, in case of performing the control according to the fourth embodiment. Concretely, FIG. 15 shows a time change of the supercharging pressure, the opening and closing of the exhaust gas switching valve 15, the opening and closing of the intake air switching valve 6 and the exhaust pressure, in descending order. Specifically, a solid line F1 shows the target supercharging pressure, and a solid line F2 shows the actual supercharging pressure. Additionally, a broken line F3 shows the final switching supercharging pressure after the basic switching supercharging pressure is corrected by any one of the methods indicated in the first to third embodiments. The final switching supercharging pressure shown by the broken line F3 is set lower than the basic switching supercharging pressure shown by the broken line E3 in FIG. 14.

In this case, the exhaust gas switching valve 15 is opened at the corrected valve opening speed as shown by an arrow F4, and the intake air switching valve 6 is opened at the corrected valve opening timing as shown by an arrow F5. Concretely, the exhaust gas switching valve 15 is opened at relatively fast valve opening speed, and the intake air switching valve 6 is opened at relatively early valve opening timing. In details, the valve opening speed of the exhaust gas switching valve 15 as shown by the arrow F4 is faster than the valve opening speed as shown by the arrow E4 in FIG. 14, and the valve opening timing of the intake air switching valve 6 as shown by the arrow F5 is earlier than the valve opening timing as shown by the arrow E5 in FIG. 14. As shown in FIG. 15, by correcting the valve opening speed of the exhaust gas switching valve 15 and the valve opening timing of the intake air switching valve 6, it can be understood that the overshoot of the supercharging pressure and the exhaust pressure does not occur.

Next, a description will be given of a concrete example of a correction method of the valve opening speed of the exhaust gas switching valve 15 and the valve opening timing of the intake air switching valve 6.

As an example, when the single turbo mode is switched to the twin turbo mode, the ECU 50 corrects the valve opening speed of the exhaust gas switching valve 15 and the valve opening timing of the intake air switching valve 6, based on the difference between the target supercharging pressure and the actual supercharging pressure. In other words, the ECU 50 corrects the switching time from the single turbo mode to the twin turbo mode, based on the difference between the target supercharging pressure and the actual supercharging pressure. Specifically, as the difference between the target supercharging pressure and the actual supercharging pressure becomes larger, the ECU 50 sets the valve opening speed of the exhaust gas switching valve 15 faster and sets the valve opening timing of the intake air switching valve 6 earlier. Namely, the switching time is set shorter as the difference becomes larger, and the switching time is set longer as the difference becomes smaller.

As another example, when the single turbo mode is switched to the twin turbo mode, the ECU 50 corrects the valve opening speed of the exhaust gas switching valve 15 and the valve opening timing of the intake air switching valve 6, based on the difference between the target supercharging pressure and the basic switching supercharging pressure. In other words, the ECU 50 corrects the switching time from the single turbo mode to the twin turbo mode, based on the difference between the target supercharging pressure and the basic switching supercharging pressure. Specifically, as the difference between the target supercharging pressure and the basic switching supercharging pressure becomes larger, the ECU 50 sets the valve opening speed of the exhaust gas switching valve 15 faster and sets the valve opening timing of the intake air switching valve 6 earlier. Namely, the switching time is set shorter as the difference becomes larger, and the switching time is set longer as the difference becomes smaller.

As still another example, when the single turbo mode is switched to the twin turbo mode, the ECU 50 corrects the valve opening speed of the exhaust gas switching valve 15 and the valve opening timing of the intake air switching valve 6, based on the driving state (exhaust energy) of the internal combustion engine 8. In other words, the ECU 50 varies a correction amount for correcting the switching time from the single turbo mode to the twin turbo mode, based on the driving state (exhaust energy) of the internal combustion engine 8. Specifically, as the air amount and the fuel injection amount having a correlation with the exhaust energy become larger, the ECU 50 sets the valve opening speed of the exhaust gas switching valve 15 faster and sets the valve opening timing of the intake air switching valve 6 earlier. Namely, the correction amount of the switching time is set larger as the air amount and the fuel injection amount become larger, and the correction amount of the switching time is set smaller as the air amount and the fuel injection amount become smaller.

As still another example, when the single turbo mode is switched to the twin turbo mode, the ECU 50 corrects the valve opening speed of the exhaust gas switching valve 15 and the valve opening timing of the intake air switching valve 6, based on more than one of the difference between the target supercharging pressure and the actual supercharging pressure, the difference between the target supercharging pressure and the basic switching supercharging pressure and the driving state (exhaust energy) of the internal combustion engine 8.

According to the above-mentioned fourth embodiment, by appropriately correcting the valve opening speed of the exhaust gas switching valve 15 and the valve opening timing of the intake air switching valve 6, it becomes possible to prevent the overshoot of the supercharging pressure and the exhaust pressure more effectively.

In the above embodiment, such an example that the valve opening speed of the exhaust gas switching valve 15 is corrected when the single turbo mode is switched to the twin turbo mode is shown. Instead of this, the valve opening timing of the exhaust gas switching valve 15 may be corrected. Concretely, the ECU 50 can perform the correction so that the valve opening timing of the exhaust gas switching valve 15 becomes earlier, instead of performing the correction so that the valve opening speed of the exhaust gas switching valve 15 becomes faster.

In the above embodiment, such an example that the valve opening timing of the intake air switching valve 6 is corrected when the single turbo mode is switched to the twin turbo mode is shown. Instead of this, the valve opening speed of the intake air switching valve 6 may be corrected. Concretely, the ECU 50 can perform the correction so that the valve opening speed of the intake air switching valve 6 becomes faster, instead of performing the correction so that the valve opening timing of the intake air switching valve 6 becomes earlier.

[Modification]

It is not limited that the present invention is applied to the system in which two turbochargers 4, 5 are arranged in parallel with each other on the intake air passage 3 and the exhaust passage 10. The present invention can be applied to a system in which two turbochargers (high pressure turbocharger and low pressure turbocharger) are arranged in series with each other on an intake air passage and an exhaust passage, too. Namely, as for the system in which two turbochargers are arranged in series, the basic switching supercharging pressure can be corrected by the above-mentioned method so as to set the final switching supercharging pressure, in case of switching a mode for operating the turbochargers, too.

INDUSTRIAL APPLICABILITY

This invention can be used for an internal combustion engine having two superchargers.

The invention claimed is:

1. A supercharger control device for an internal combustion engine having a first supercharger and a second supercharger, comprising:
an intake air amount detecting unit which detects an intake air amount;
an operating unit which operates the engine with only the first supercharger in a single turbo mode and operates the engine with both the first supercharger and the second supercharger in a twin turbo mode;

a target supercharging pressure determining unit which determines a target supercharging pressure based on a driving state of the engine;

an actual supercharging pressure detecting unit which detects an actual supercharging pressure;

a switching supercharging pressure setting unit which sets a basic switching supercharging pressure used for switching from the single turbo mode to the twin turbo mode based on the intake air amount;

a switching supercharging pressure correcting unit which corrects the basic switching supercharging pressure to determine a corrected switching supercharging pressure based on a supercharging pressure difference between the target supercharging pressure and the actual supercharging pressure; and a switching control unit which controls the operating unit to switch an operation mode of the engine from the single turbo mode to the twin turbo mode when the actual supercharging pressure reaches the corrected switching supercharging pressure, wherein the switching supercharging pressure correcting unit determines the corrected switching supercharging pressure to be a lower pressure when the supercharging pressure difference between the target supercharging pressure and the actual supercharging pressure is larger, and the switching supercharging pressure correcting unit determines the corrected switching supercharging pressure to be a higher pressure when the supercharging pressure difference between the target supercharging pressure and the actual supercharging pressure is smaller.

2. The supercharger control device for an internal combustion engine according to claim 1, wherein the switching supercharging pressure correcting unit corrects the switching supercharging pressure further based on a difference between the basic switching supercharging pressure and the target supercharging pressure.

3. The supercharger control device for an internal combustion engine according to claim 1, wherein the switching supercharging pressure correcting unit corrects the switching supercharging pressure, based on a driving state of the internal combustion engine.

4. The supercharger control device for an internal combustion engine according to claim 1, further comprising a unit which adjusts a valve opening speed or a valve opening timing of an exhaust gas switching valve, and adjusts a valve opening speed or a valve opening timing of an intake air switching valve, based on the difference between the target supercharging pressure and the actual supercharging pressure, when the switching control unit switches from the single turbo mode to the twin turbo mode.

5. The supercharger control device for an internal combustion engine according to claim 1, further comprising a unit which adjusts a valve opening speed or a valve opening timing of an exhaust gas switching valve, and adjusts a valve opening speed or a valve opening timing of an intake air switching valve, based on a difference between the basic switching supercharging pressure and the target supercharging pressure, when the switching control unit switches from the single turbo mode to the twin turbo mode.

6. The supercharger control device for an internal combustion engine according to claim 1, further comprising a unit which adjusts a valve opening speed or a valve opening timing of an exhaust gas switching valve, and adjusts a valve opening speed or a valve opening timing of an intake air switching valve, based on a driving state of the internal combustion engine, when the switching control unit switches the operation mode of the engine from the single turbo mode to the twin turbo mode.

7. The supercharger control device for an internal combustion engine according to claim 1, wherein the first supercharger and the second supercharger are arranged in parallel with each other on an intake air passage and an exhaust passage.

* * * * *

UNITED STATES PATENT AND TRADEMARK OFFICE
CERTIFICATE OF CORRECTION

PATENT NO.        : 8,813,493 B2
APPLICATION NO.   : 13/003820
DATED             : August 26, 2014
INVENTOR(S)       : Kazuki Iwatani et al.

It is certified that error appears in the above-identified patent and that said Letters Patent is hereby corrected as shown below:

In the Specification

At column 1, line 60, change "two superchargers" to -- "two superchargers. --.

At column 4, line 40, change "an FGR" to -- an EGR --.

At column 4, line 65, change "pressure) and" to -- pressure), and --.

At column 5, line 9, change "engine is" to -- engine 8 is --.

At column 9, line 7, change "is obtained," to -- is obtained. --.

At column 9, line 27, change "line 33" to -- line B3 --.

At column 9, line 34, change "areas 34, 35" to -- areas B4, B5 --.

At column 16, line 17, change "manner) Additionally," to -- manner). Additionally, --.

At column 16, line 19, change "an arrow 54" to -- an arrow E4 --.

At column 16, line 21, change "an arrow 55" to -- an arrow E5 --.

Signed and Sealed this
Twenty-third Day of June, 2015

Michelle K. Lee
*Director of the United States Patent and Trademark Office*